US012754615B2

(12) United States Patent
Brewer et al.

(10) Patent No.: US 12,754,615 B2
(45) Date of Patent: Oct. 6, 2026

(54) INDIRECT MOTION MAPPING PIPELINE AND PINCH CENTROID

(71) Applicant: Apple Inc., Cupertino, CA (US)

(72) Inventors: Daniel J. Brewer, Redwood City, CA (US); Chase B. Lortie, San Francisco, CA (US); David J. Meyer, Menlo Park, CA (US); Julian K. Shutzberg, San Francisco, CA (US); Tian Qiu, Mountain View, CA (US); Yirong Tang, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/675,796

(22) Filed: May 28, 2024

(65) Prior Publication Data

US 2024/0402826 A1 Dec. 5, 2024

Related U.S. Application Data

(60) Provisional application No. 63/505,940, filed on Jun. 2, 2023.

(51) Int. Cl.
*G06F 3/01* (2006.01)

(52) U.S. Cl.
CPC .................................... *G06F 3/017* (2013.01)

(58) Field of Classification Search
CPC ...... G06F 3/017; G06F 3/011; G06F 3/04842; G06F 3/0304; G06F 3/0485; G06F 3/0488; G06V 40/28; G06V 40/20; G06T 7/246; G06T 19/006; G06T 19/20
See application file for complete search history.

(56) References Cited

U.S. PATENT DOCUMENTS

| | | | | |
|---|---|---|---|---|
| 2015/0242101 | A1* | 8/2015 | Ishino | G06F 3/017 715/776 |
| 2015/0324001 | A1* | 11/2015 | Yanai | G06F 3/011 345/156 |
| 2016/0320846 | A1* | 11/2016 | De Michele | G06V 40/107 |
| 2017/0193289 | A1* | 7/2017 | Karmon | G06F 3/0304 |
| 2018/0143693 | A1* | 5/2018 | Calabrese | G06V 40/193 |
| 2018/0307397 | A1 | 10/2018 | Hastings | |
| 2019/0126140 | A1* | 5/2019 | Nelson | A63F 13/20 |
| 2021/0200322 | A1* | 7/2021 | Doganis | G06F 30/10 |
| 2021/0263593 | A1* | 8/2021 | Lacey | G02B 27/017 |
| 2023/0031200 | A1* | 2/2023 | Dao | G06F 1/163 |
| 2024/0070992 | A1* | 2/2024 | Lucas | G06T 7/251 |
| 2024/0193882 | A1* | 6/2024 | Spong | G06F 3/017 |
| 2026/0037071 | A1* | 2/2026 | Kojima | G06F 3/017 |

FOREIGN PATENT DOCUMENTS

WO 2021173839 A1 9/2021

* cited by examiner

*Primary Examiner* — Grant Sitta
(74) *Attorney, Agent, or Firm* — Blank Rome LLP

(57) ABSTRACT

Processing gesture input includes obtaining hand tracking data for a hand from one or more sensors, wherein the hand performs a pinch in the hand tracking data, determining a hand position and a hand orientation for the hand from the hand tracking data, applying a predefined offset from the hand position based on the hand orientation to determine a pinch centroid, and determining an input location based on the pinch centroid. The pinch centroid is used in an indirect motion mapping pipeline to determine characteristics of user input based on user motion.

20 Claims, 9 Drawing Sheets

INDIRECT MOTION MAPPING PIPELINE AND PINCH CENTROID

BACKGROUND

Some devices can generate and present Extended Reality (XR) Environments. An XR environment may include a wholly or partially simulated environment that people sense and/or interact with via an electronic system. In XR, a subset of a person's physical motions, or representations thereof, are tracked, and in response, one or more characteristics of one or more virtual objects simulated in the XR environment are adjusted in a manner that comports with realistic properties. Some XR environments allow multiple users to interact with virtual objects or with each other within the XR environment. For example, users may use gestures to interact with components of the XR environment. However, what is needed is an improved technique to manage tracking of a hand performing the gesture.

DETAILED DESCRIPTION

Figure 1A:
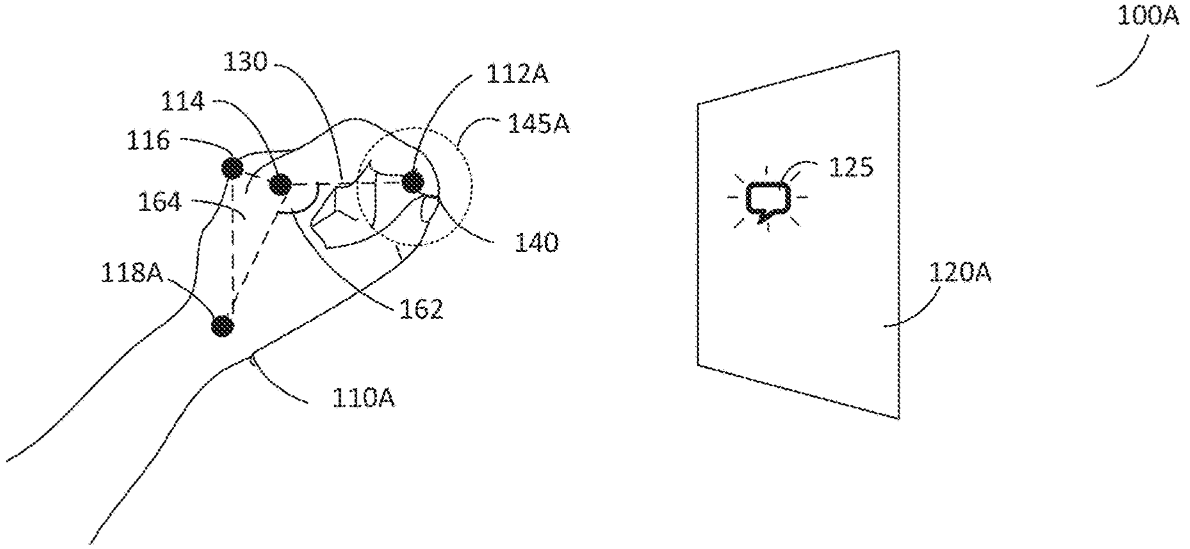
FIGS. 1A-1B show example diagrams of hand tracking, in accordance with one or more embodiments.

This disclosure pertains to systems, methods, and computer readable media to enable gesture recognition and input. In some enhanced reality contexts, image data and/or other sensor data can be used to detect gestures by tracking hand data. Techniques described herein are directed to detecting an indirect user input gesture and processing the gesture as a user input action. In particular, techniques described herein are directed to determining the features of a user input at action that involves a pinch such that a location and motion of the pinch can be translated into user input.

According to some embodiments, a pinch centroid can be determined for a hand for user input determination. The pinch centroid can be determined based on a particular location relationship to a hand. For instance, the pinch centroid may be at a location at which two fingers, such as an index finger and thumb, make contact, or may be determined in another manner—such as an offset from a hand origin or other location. In some embodiments, the pinch centroid may be associated with other characteristics, such as a deadband, which is configured to mitigate jitter or other artifacts arising from sensor readings, or unintended user motion when attempting to perform the pinch.

In some embodiments, the pinch centroid can be used for indirect gestures to provide user input. An input gestures is a gesture which, when detected, causes initiation of a user input action. An indirect gesture is an input gesture in which a user is interacting with a virtual component without attempting to make contact with the virtual component. For example, an indirect gesture may include a pinch, a scroll, or the like. Indirect gestures may be performed by one or two hands. For example, an indirect 2D two handed gesture may entail a zoom, rotate, draw, or the like, and which relies on the manipulator pose, may use the pinch centroid for determination as to a user input location. As another example, given an indirect gesture such as a scroll or other interaction pose, the pinch centroid may be used along with body estimates to determine user centric motion from which a contact position can be determined. In some embodiments, determining a contact position may also include applying sensitivity scaling to the user centric motion. In another example, the pinch centroid may be used for indirect 3D gestures, such as window placement, drag-and-drop, or the like. In these indirect 3D gestures, the pinch centroid may be used along with body estimates to determine 3D motion mapping, from which a world position for the user input can be determined.

In the following disclosure, a physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an XR environment refers to a wholly or partially simulated environment that people sense and/or interact with via an electronic device. For example, the XR environment may include Augmented Reality (AR) content, Mixed Reality (MR) content, Virtual Reality (VR) content, and/or the like. With an XR system, a subset of a person's physical motions, or representations are tracked, and in response, one or more characteristics of one or more virtual objects simulated in the XR environment, are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and adjust graphical content and an acoustic field presented to the person in a manner, similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include: head-mountable systems, projection-based systems, heads-up displays (HUD), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood, however, that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes and may not have been selected to delineate or circumscribe the inventive subject matter, or resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developer's specific goals (e.g., compliance with system- and business-related constraints) and that these goals may vary from one implementation to another. It will also be appreciated that such development efforts might be complex and time-consuming but would nevertheless, be a routine undertaking for those of ordinary skill in the design and implementation of graphics modeling systems having the benefit of this disclosure.

FIG. 1A shows a diagram of a technique for using a pinch centroid for user input, in accordance with one or more embodiments. In particular, in a first view, 100A, hand 110A of a user is performing a pinch. The location in the real-world at which the pinch is determined to be performed is considered at the pinch centroid 112A, in accordance with one or more embodiments. A pinch centroid 112A may be determined in a number of ways. For example, the pinch centroid 112A may be determined based on a location in the real-world at which contact is determined to be made between a first surface and the second surface, such as an index finger pad and a thumb pad, as shown at 140. Alternatively, other estimations of the pinch centroid 112A can be used. In this example, the pinch centroid is based on a relative location to the hand when the pinch occurs.

In the diagram of FIG. 1A, a pinch centroid 112A is determined based on an estimation of the location as an offset of the location of the hand. According to some embodiments, a hand pose is determined. The hand pose may be determined based on hand tracking data or other data providing positional information for the hand. In some embodiments, the hand pose may be determined based on predicted locations of one or more joints of the hand. For example, a hand tracking network may provide estimated locations of each of a set of joints of the hand. In some embodiments, a hand pose may be determined based on a relative location of a set or subset of these joints. In this example, a wrist location 118A is compared against on index finger knuckle 114 and a pinky knuckle 116 to identify the position and orientation of the hand (e.g., hand pose). The index finger knuckle 114 and the pinky knuckle 116 may be knuckle positions of the top of the hand at which each of the fingers originates. According to some embodiments, the relative location of the wrist location 118A, index finger knuckle 114, and pinky knuckle 116 may provide a geometric plane 164 from which the orientation of the hand can be determined. The position of the hand in real space can be determined similarly. In some embodiments, the positional location of the hand may be determined based on the same subset of joint locations, or a different subset of joint locations. For example, the wrist location 118A and a location of the index knuckle 114 may be used. However, a different set of joint locations can be used. In addition, the subset of joint locations used for determining the position and/or orientation for the hand may be dynamically modified based on contextual information, hand tracking information, or the like. For example, an occlusion determination may be made based on the joint locations. If a portion of the hand is occluded, such as the pinky knuckle 116, an alternative joint location may be used for determining orientation, position, or the like.

In some embodiments, the pinch centroid can be determined based on an offset 130 from the hand pose. This may be a predefined global offset distance for any user, a personalized offset distance for a particular user's anatomy (for example, bone length information from a user profile store, enrollment data, or the like), or some other distance. In some embodiments, the offset 130 may be determined in a predefined direction based on the hand pose data. For example, based on a plane 164 derived from the wrist location 118, index finger knuckle 114, and pinky knuckle 116, the offset 130 may be determined at a predefined angle 162. The offset may be determined from a particular point on the hand, such as the index knuckle 114 as shown, or may be determined from a central portion or origin of the hand derived from the hand position or orientation, or the like. The result of the offset 130 from the hand pose provides the pinch centroid 112A. In some embodiments, the pinch centroid 112A may or may not be collocated with the actual location where contact occurs between the two fingers, as shown at 140.

The pinch centroid may have additional characteristics applied to it, such as a dead zone 145A. The dead zone 145A can include a predefined or dynamic zone around the pinch centroid such that any input determination that begins and ends within the dead zone may be reported as a tap. That is, the motion detected within the dead zone 145A when the fingers are in a pinched position is ignored for consideration of a user input gesture. In doing so, jitter from unintended user movement for sensors sensitivity can be mitigated. For example, if the duration of a pinch lasts multiple frames, but the location of the pinch remains within the dead zone 145A, then the resulting output may be considered to be tap gesture. In contrast, if during the duration of the pinch (i.e., when the fingers are in the pinched position), the pinch centroid exits the dead zone 145A, then the dead zone will be mitigated (e.g., decreased in size and/or removed) and the motion of the pinch will be translated into a corresponding movement of the user input. As such, the gesture may be processed as a scroll or a drag rather than a tap.

In some embodiment, the dead zone 145A may be a dynamic dead zone. A dynamic dead zone may change in size based on characteristics of a movement of the user. For example, during a wrist scroll, where a user is rotating a pinch centroid around the wrist, a deadband may be disabled. In some embodiments, the dynamic dead zone may shrink after a predetermined amount of time to better distinguish between long presses and drags. As another example, a dead zone can increase in size for quick movements such as high velocity repeated pinches.

According to one or more embodiments, the pinch centroid 112A can be used for user input. In this example, hand 110A is performing a pinch gesture, which is determined to be a valid input gesture for triggering a user input action as shown within the user interface 120A. As such, the user input component 125 is shown as selected. Although user interface 120A is depicted as being in front of the hand, it should be understood that in some embodiments, the user input component may be a virtual input component presented, for example, on a display of head mounted device, such as a headset, such that the user interface 120A appears in front of the user's hand to a user using the head mounted device. As such, the user input component 125 is shown as selected.

Figure 1B:
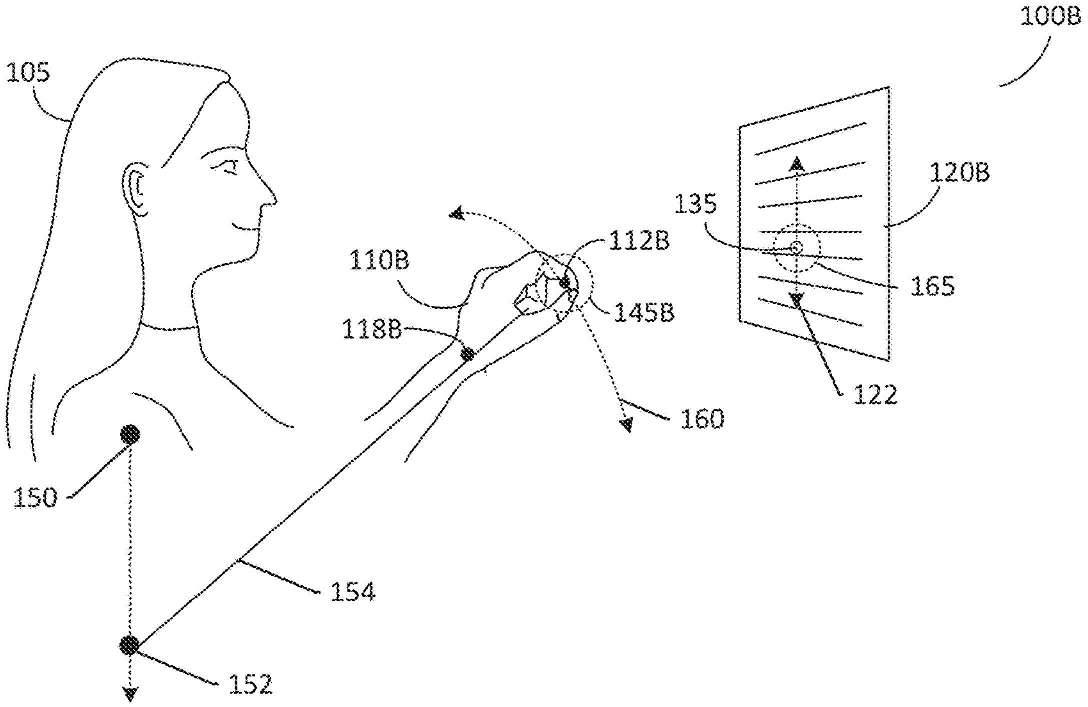

In some embodiments, additional signals may be used for using a pinch centroid for user input, in accordance with one or more embodiments. Turning to FIG. 1B, a system setup 100B is provided in which a user 105 is viewing the user interface 120B. In FIG. 1B, the user 105 is performing a gesture using hand 110B, which is extended from the user's body. As shown, the motion 160 caused by hand 110B is provided in an arc motion. In some embodiments, the motion is tracked in a spherical coordinate system. The spherical coordinate system provides an arc length of a motion 160 with respect to an origin 152. As shown, the origin is at 152, which may be coincident to a user's body. However, in some embodiments, the origin may be considered at a shoulder joint 150, a wrist location 118B, or some other origin determined based on predicted joint locations of the user 105. The arc length of motion 160 can be determined based on a radius 154 which is determined from the origin 152 to a pinch centroid 112B of the hand, which can be determined as described above with respect to FIG. 1A. The user motion in 3D space, as shown by motion 160, is mapped to a 2D user interface ("UI") plane, for example user interface 120B. For example, a user input component 135 can move in a direction 122 across the 2D plane of the user interface 120B based on the mapping of the user motion 160.

In some embodiments, an input gesture may be determined based on the motion 160 upon the pinch centroid 112B exiting the dead zone 145B. According to one or more embodiments, indirect gestures that involve motion, such as a drag or scroll, can utilize a deadband 165 surrounding a user input component 135. Additionally, or alternatively, the deadband 165 could surround the pinch centroid 112B. The deadband 165 may be used to reduce jitter based on unintended user movement or sensor sensitivity during a user motion 160. The deadband 165 can include a predefined or dynamic zone around a user input location based on the pinch centroid such that any input determination within the deadband 165 may be reported from the central point of the deadband 165. As such, a user performing the motion 160 with a slight jitter may not see the jitter reflected back in the movement direction 122 on the user interface 120B. That is, the deadband 165 may follow the pinch centroid 112B and provides a zone such that when movement of the hand stops, the deadband 165 will cause the input location on the UI to remain still even if there are small jitters.

According to some embodiments, additional motion mapping may be applied to the motion 160 to impact the resulting movement of a user input component. For example, if the user 105 were to move the entire user interface 120B, the resulting movement of the user interface 120B may be represented in an arced manner rotating around a point of the user, such as the user's head. Further, in some embodiments, sensitivity scaling and acceleration curves may be applied to the motion 160 in order to preserve low speed precision while allowing larger gain at high speeds.

Figure 2:
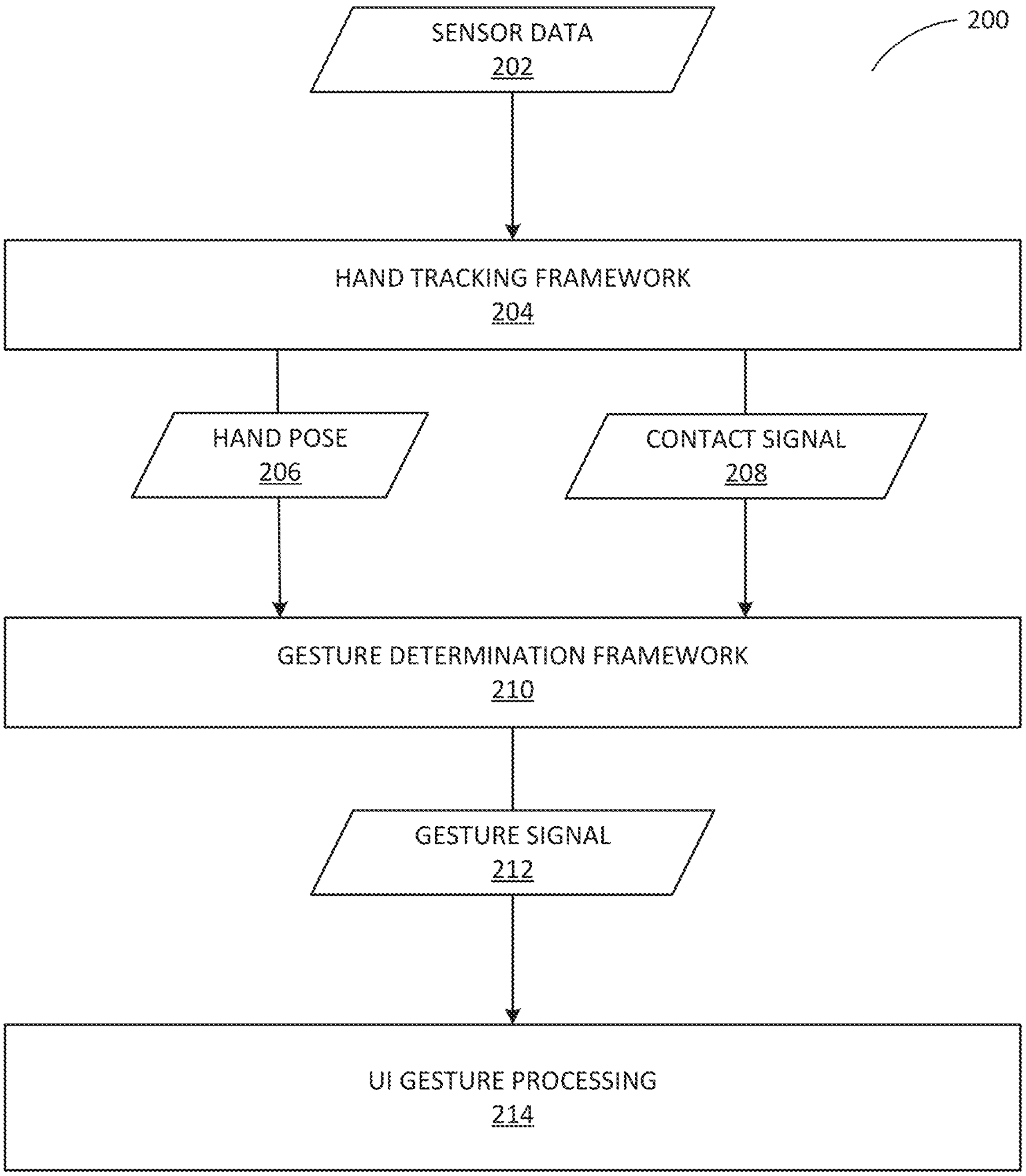
FIG. 2 shows a flow diagram of a technique for detecting input gestures, in accordance with some embodiments.

FIG. 2 shows a flow diagram of a technique for detecting input gestures, in accordance with some embodiments. In particular, FIG. 2 shows a gesture estimation pipeline in which a user input gesture is recognized and processed. Although the flow diagram shows various components which are described as performing particular processes, it should be understood that the flow of the diagram may be different in accordance with some embodiments, and the functionality of the components may be different in accordance with some embodiments.

The flow diagram 200 begins with sensor data 202. In some embodiments, the sensors data may include image data and/or depth data captured of a user's hand or hands. In some embodiments, the sensor data may be captured from sensors on an electronic device, such as outward facing cameras on a head mounted device, or cameras otherwise configured in an electronic device to capture sensor data including a user's hands. According to one or more embodiments, the sensor data may be captured by one or more cameras, which may include one or more sets of stereoscopic cameras. In some embodiments, the sensor data 202 may include additional data collected by an electronic device and related to the user. For example, the sensor data may provide location data for the electronic device, such as position and orientation of the device.

In some embodiments, the sensor data 202 may be applied to a hand tracking network 204. The hand tracking network may be a network trained to estimate a physical state of a user's hand or hands. In some embodiments, the hand tracking network 204 predicts hand pose data 206. The hand pose may be a classified pose of a hand based on the estimated physical state, or may provide some other form of data indicative of a pose of a hand. For example, in some embodiments, the hand pose data 206 may include an estimation of joint location for a hand. Further, in some embodiments, the hand tracking network 204 may be trained to provide an estimation of an estimate of a device location, such as a headset, and/or simulation world space.

In some embodiments, the hand tracking network 204 may further be configured to provide contact data. The contact data may include a prediction as to whether, for a given frame or frames, a contact event is occurring between two regions on the hand. For example, a machine learning model may be trained to predict whether a thumb pad and index finger are in contact. For purposes of the description herein, a contact event refers to contact between two surfaces regardless of intent, whereas a pinch is defined as a contact event being performed with the intent of producing a corresponding input action. As will be described in greater detail below, in some embodiments, the hand tracking may predict whether a contact event occurs based on the sensor data 202 and/or hand pose data 206.

According to one or more embodiments, gesture determination framework 210 provides a determination as to whether a particular pose presented in the sensor data 202 is intentional. That is, a determination is made as to whether a classified pose of the hand (for example, based on or provided by the hand pose data 206) is intentional. When the determined hand pose includes a contact event, such as a pinch, then the gesture determination framework 210, may use the contact signal 208 provided by the hand tracking network 204 in determining whether an intentional gesture is performed.

In some embodiments, the gesture determination framework 210 may utilize additional data not explicitly depicted in FIG. 2. For example, the gesture determination framework 210 may receive gesture signal(s) 212, such as user interface (UI) geometry, gaze estimation, events generated by connected peripherals, user interaction with objects, and the like. The gesture signal 212 may indicate whether or not an intentional input gesture has occurred. In some embodiments, the gesture signal 212 may also be used to indicate whether a previous gesture signal should be cancelled. This may occur, for example, if a user shifts their position, sets their hands down, or the like.

The UI gesture processing module 214 may be configured to enable a user input action based on the gesture signal 212. A particular gesture, such as a pinch, may be associated with a selection action of a UI component or the like. In some embodiments, if a cancellation signal is received corresponding to a gesture signal 212 which has already been initiated, the system can process that gesture differently than if it were not cancelled. For example, a UI component can be shown as selected but not activated, etc. As another example, a previously initiated stroke drawn by the user can be truncated or undone.

Figure 3:
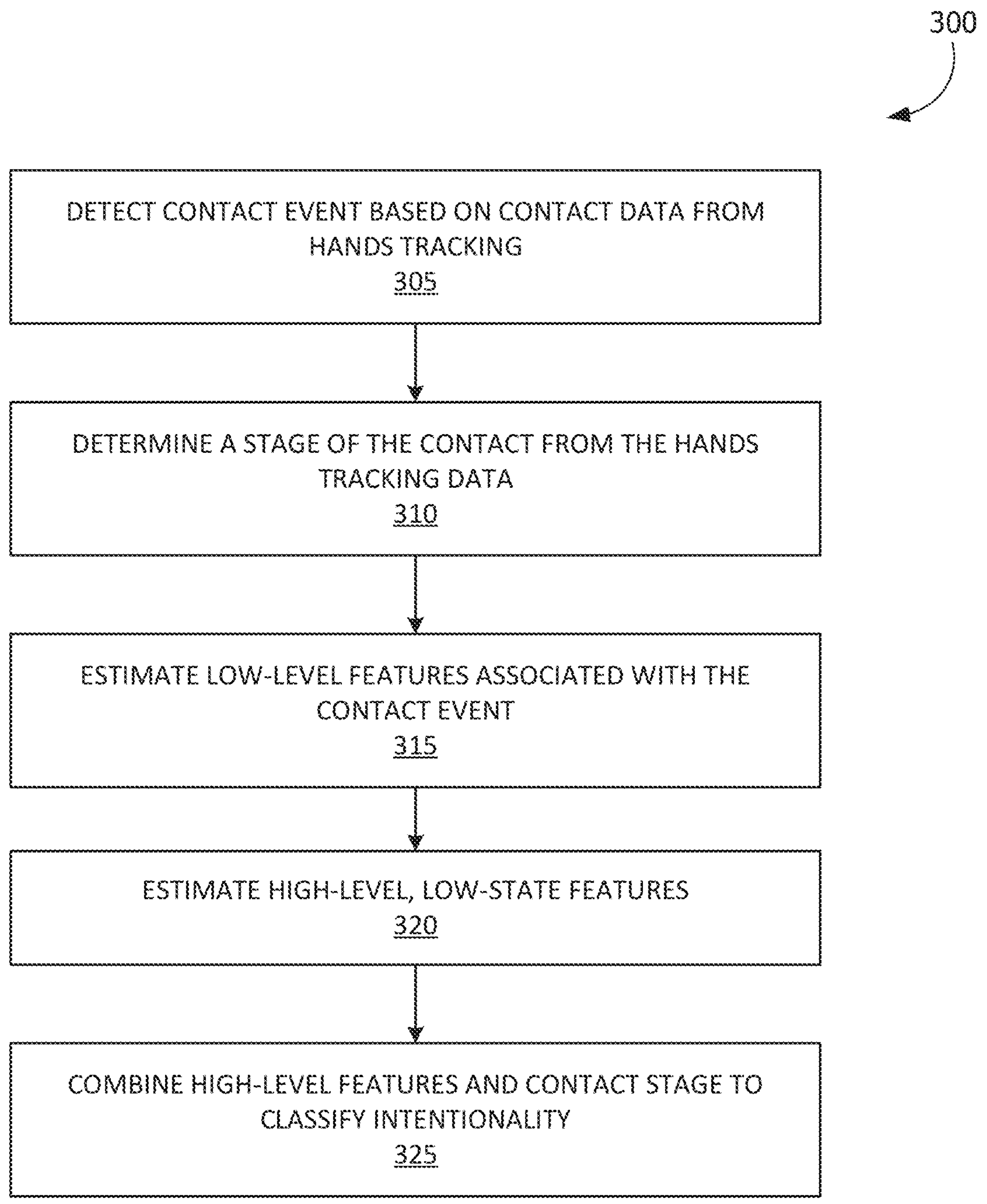
FIG. 3 shows a flowchart of a technique for determining intentionality of a gesture, in accordance with some embodiments.

As described above, the gesture determination framework 210 may be configured to generate a classification of intentionality for a gesture. The gesture determination framework 210 may be configured to estimate a pose or gesture of a hand and determine whether the gesture was intended to be used for triggering a user input action. FIG. 3 shows a flowchart of a technique for classifying intentionality of a gesture, in accordance with some embodiments. For purposes of explanation, the following steps will be described as being performed by particular components of FIG. 2. However, it should be understood that the various actions may be performed by alternate components. The various actions may be performed in a different order. Further, some actions may be performed simultaneously, and some may not be required, or others may be added.

The flowchart 300 begins at block 305, where a contact event is detected based on context data from the hand tracking network. The contact event may be detected, for example, based on a contact signal 208 received from the hand tracking network 204. According to some embodiments, some gestures may require contact, such as a pinch or the like. Further, multiple types of pinches may be recognized with different kinds of contact. According to some embodiments, not every gesture may require a contact event. As such, the contact may not be detected, or the contact signal 208 may indicate that the contact occurs. In some embodiments, the contact signal 208 may not be received, or may otherwise be ignored and a gesture may still be recognized.

The flowchart 300 continues to block 310, where a contact stage is determined from hand tracking data. The contact stage may indicate, for a given frame, what phase of the contact event the fingers are currently in. According to some embodiments, the features of interest in determining intentionality may vary depending upon a current state of a gesture. For gestures that include a pinch or other contact event, the stage in which the gesture is currently in may affect the ability to enable, cancel, or reject an associated input action. Some examples of contact stage include an idle state, an entry state in which a contact event is beginning, such as a pinch down phase, a hold state, where a pinch is currently occurring, and an exit stage, for example when a pinch up occurs for the pinch is ending.

At block 315, low-level features are estimated in association with the contact event. The low-level features may be determined from the hand tracking data and/or additional data may include estimations of what a hand is doing during the frame. For example, other sources of data include pose information for a device capturing the hand tracking data, hand pose, UI geometry, etc. In some embodiments, the low-level features are determined without regard for intent. Examples of low-level features include, for example, a pinch speed on pinch down, a measure of wrist flex, finger curl, proximity of hand to head, velocity of hand, and the like.

The flowchart 300 continues to block 320, where high-level, low-state features are estimated. The high-level, low-state features may include modal features which estimate what a user is doing during the contact event in order to determine intentionality. In some embodiments, the high-level features may be features which are interoperable, and which can be individually validated. Examples include estimates as to whether hands are using one or more peripheral devices, a frequency of a repetition of a gesture (for example, if a user is pinching quickly), if hand is holding an object, if a hand is in a resting position, and/or a particular pinch or gesture style (i.e., a pinch using pads of two fingers, or using the side of a finger). In some embodiments, the high-level features may be based on user activity, such as a user fidgeting, talking, or reading. According to one or more embodiments, the high-level features may be determined based on the hand tracking data, the determined contact stage, and/or the estimated basic features. In some embodiments, the high-level features may directly determine intentionality of an action. As an example, if a user is using a peripheral device such as a keyboard, a pinch may be rejected, or the gesture may be determined to be unintentional.

The flowchart concludes at block 325, where the gesture determination framework 210 combines high level features and the contact stage to classify intentionality. In some embodiments, the gesture determination framework 210, uses a conditional combination of high-level features and contact stage to classify intentionality. The classification can then be used to signal the gesture to be processed as an input gesture (thereby activating an associated UI input action), cancel the associated action if the gesture is determined to be unintentional (for example, if a UI action associated with the gesture has already been initiated), or disregard the gesture.

Figure 4:
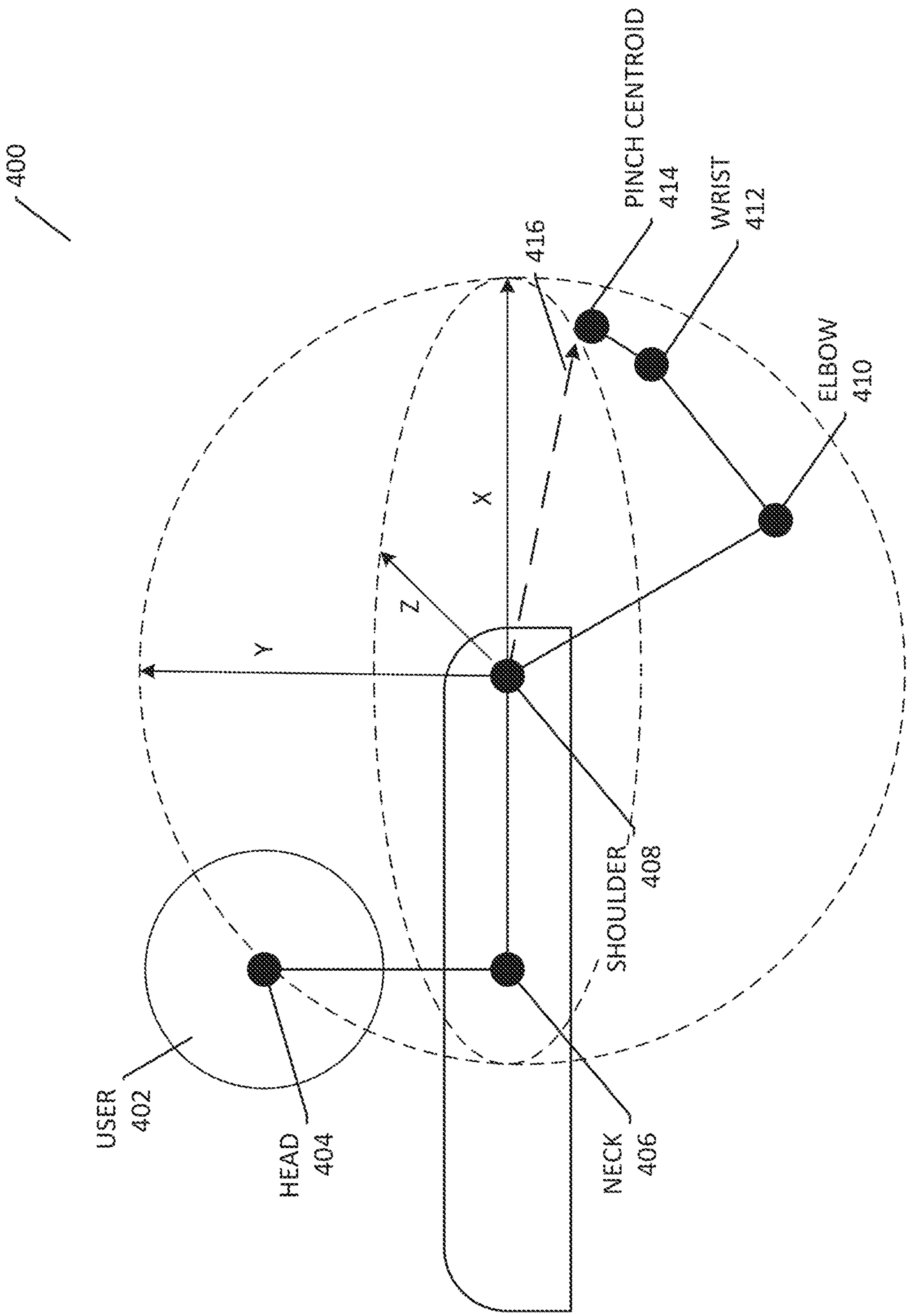
FIG. 4 shows a diagram for user-centric motion mapping, in accordance with some embodiments.

Turning to FIG. 4, a diagram is presented of various locations on a body used for motion mapping. Specifically, shoulder 408 is shown with respect to a determined neck position 406 and a determined head position 404. In some embodiments, a system providing the motion mapping may be concurrently tracking a head position 404 and/or a neck position 406, from which the position of the shoulder 408 can be determined. According to one or more embodiments, a tracking network may provide a predicted location of a set of joints of a user 402, such as a head 404, neck 406, shoulder 408, elbow 410, and wrist 412. The pinch centroid 414 can be determined as described above with respect to FIGS. 1A-1B.

A distance 416 can be determined from an origin to a pinch centroid 414. In some embodiments, the distance may be determined based on a horizontal distance between the torso location, shoulder location, wrist location, or the like and the pinch centroid 414. In diagram 400, an example distance 416 is depicted between a location of the shoulder 408 and a pinch centroid 414. However, the origin may optionally be located at the elbow 410 or wrist 412, or some other position, for example depending upon a pose of the user. An arc length is determined for the motion. The arc length is determined based on distance the user's hand travels in 3D space along a curvilinear path while the gesture is being performed. In some embodiments, the arc length may be associated with directional information that is also determined.

Figure 5:
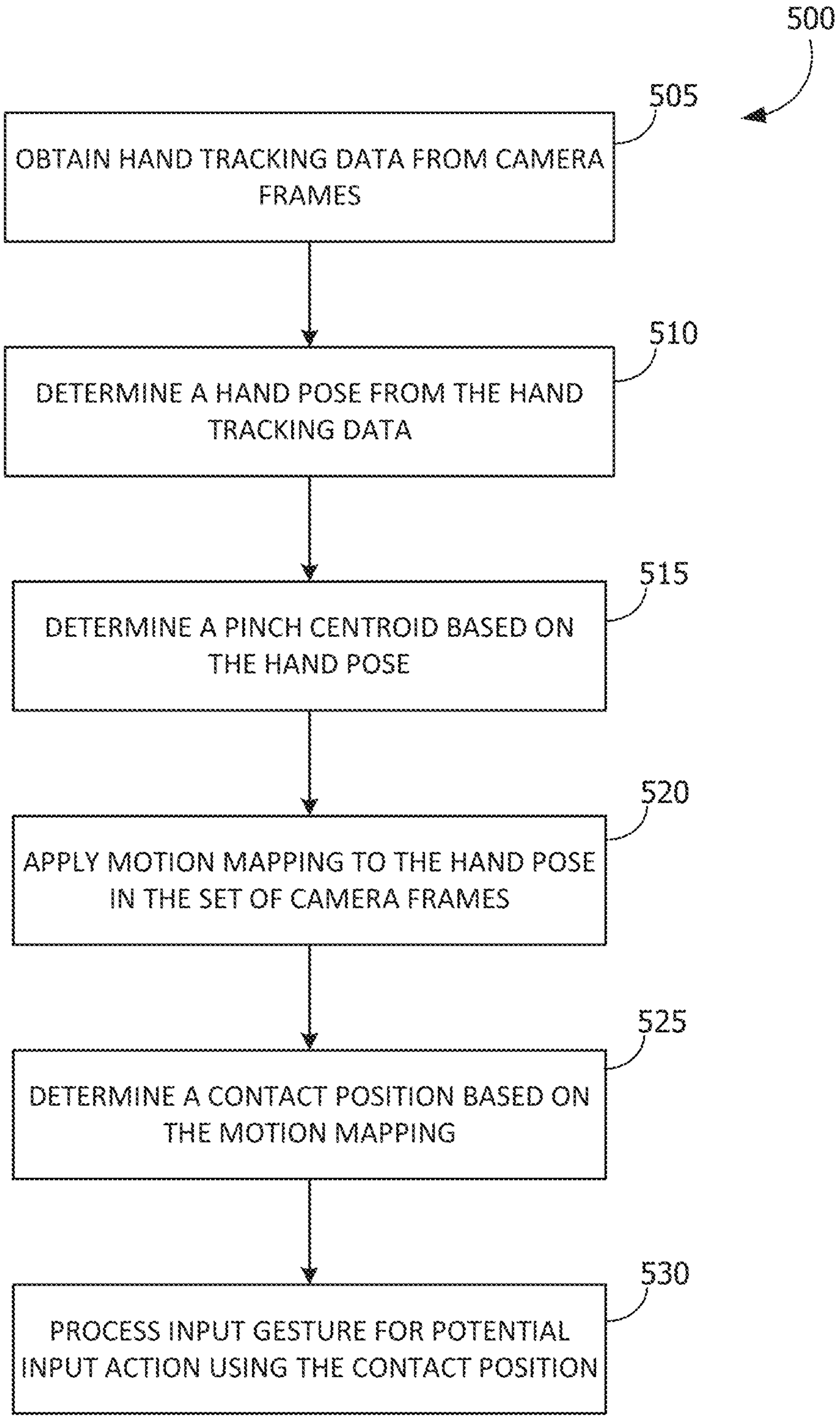
FIG. 5 shows a flowchart of a technique for an indirect motion mapping pipeline, according to some embodiments.

FIG. 5 shows a flowchart of a technique for an indirect motion mapping pipeline, according to some embodiments. In particular, FIG. 5 shows a flowchart of a technique for processing an indirect 3D gesture. For purposes of explanation, the following steps will be described as being performed by particular components of FIGS. 1-2. However, it should be understood that the various actions may be performed by alternate components. The various actions may be performed in a different order. Further, some actions may be performed simultaneously, some may not be required, or others may be added.

The flowchart 500 begins at block 505, where hand tracking data is obtained from camera frames. The hand tracking data may include, for example, image data, depth data, and the like. In some embodiments, the hand tracking data may include or be based on additional sensor data, such as image data and/or depth data captured of a user's hand or hands. In some embodiments, the sensor data may be captured from sensors on an electronic device, such as outward facing cameras on a head mounted device, or cameras otherwise configured in an electronic device to capture sensor data including a user's hands. In some embodiments, the sensor data may include additional data collected by an electronic device and related to the user. For example, the sensor data may provide location data for the electronic device, such as position and orientation of the device.

The flowchart 500 continues at block 510, where a hand pose is determined from the hand tracking data. As described above with respect to FIG. 1A, the hand pose may be determined based on the tracking data. In some embodiments, the hand pose may be determined estimation based on predicted locations of one or more joints of the hand. For example, a hand tracking network may provide estimated locations of each of a set of joints of the hand. In some embodiments, a hand pose may be determined based on a relative location of a set for subset of these joints.

At block 515, a pinch centroid is determined based on the hand pose. According to one or more embodiments, the pinch centroid is a point in space which is tracked for determining user input. As will be described below with respect to FIG. 7, the pinch centroid may be determined based on characteristics of the position and orientation of the hand. For example, the pinch centroid may be determined at a particular offset including a distance and angle from a particular location on the hand in accordance with a pose of the hand. In some embodiments, a deadband is applied to the pinch centroid such that it is tracked around the pinch centroid or an input location on a UI to reduce the impact of unintentional user movement, artifacts from sensor data, or the like. The deadband may be a region around the pinch centroid, such that as the pinch centroid moves within the deadband, the resulting user input will be based on a central location within the deadband. Accordingly, if a user shakes or jitters while moving the hand, the jitter will not be reflected back to the user in the form of user input on the user interface.

In some embodiments, the pinch centroid may also be associated with a dead zone. The dead zone may be a region surrounding an initial location of a pinch centroid in order to distinguish between a stationary input gesture, such a tap or long pinch, and a dynamic input gesture, such as a drag, scroll, or the like. According to one or more embodiments, if the pinch centroid remains within the dead zone from the instance of time when the pinch makes through to the instance of time when the pinch breaks, then detected motion for the pinch will be discarded, and the input gesture will be processed as a stationary gesture. By contrast, if the pinch centroid exits the dead zone while the fingers are in a pinched pose, then the input gesture will be determined to be a dynamic input gesture, and the motion associated with the gesture will be used for processing movement of the user input. In some embodiments, the motion associate with a gesture will additionally be processed in accordance with a deadband as described above.

The flowchart continues to block 520, where motion mapping is applied to the hand pose in the set of camera frames. In some embodiments, motion mapping may facilitate the 3D movement of UI components. According to some embodiments, motion mapping may include determining a spherical motion of these pinch centroid with respect to an origin point, as described above with respect to FIG. 1B and FIG. 4. For purposes of 3D motion, rather than mapping the court motion to a plan, the spherical motion may be mapped to a different origin, such as the user's head. As such, the 3D movement of the pinch centroid around an origin can be remapped to a more general user space, such as around the user's head or other location. In some embodiments, the user may be interacting with the user input through a headset worn by the user, and the spherical motion of the pinch centroid can be remapped to a 3D region around the headset. In some embodiments, as the user uses spherical motion for indirect 3D gestures, the spherical coordinates for the pinch centroid and the mapped motion can converge over time. At block 525, a contact position is determined based on the motion mapping.

The flowchart concludes at block 530, where an input gesture is processed for a potential input action using the contact position. The resulting input gesture may cause 3D movement of the user input component to move in a 3D manner. In some embodiments, additional treatments can be applied to the motion to improve the responsiveness of the user input. For example, an acceleration curve can be applied in order to preserve accuracy for slower movements, while increasing the game for larger movements. Scaling may also be performed, for example based on the distance of the UI component from the user, or the like.

Figure 6:
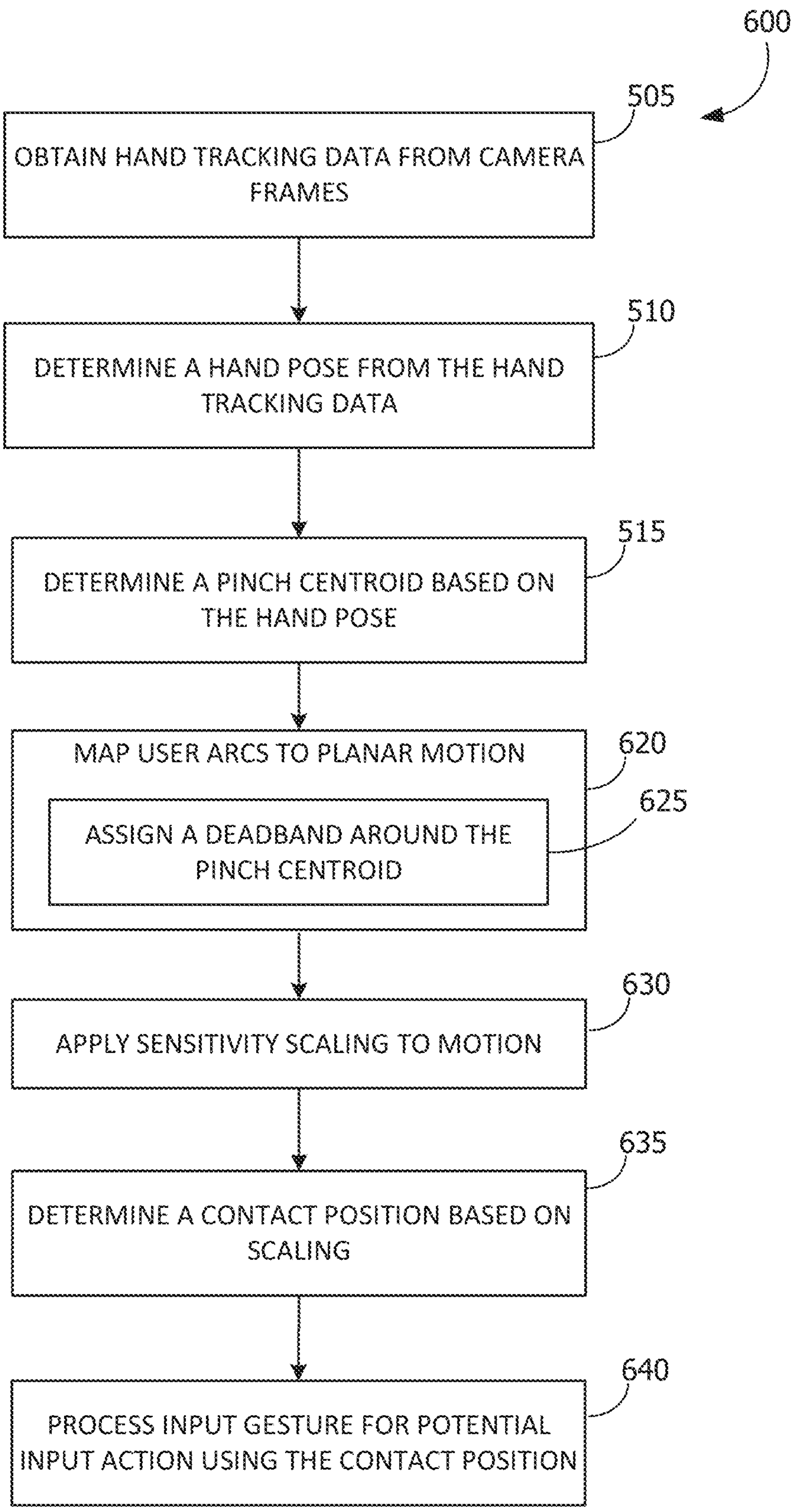
FIG. 6 shows a flowchart of a technique for an indirect motion mapping pipeline for motion tracking, in accordance with one or more embodiments.

FIG. 6 shows a flowchart of a technique for an indirect motion mapping pipeline for motion tracking, in accordance with one or more embodiments. In particular, FIG. 6 shows a flowchart of a technique for processing an indirect 2D gesture, such as a user using a hand gesture to implement an input action on a UI plane. For purposes of explanation, the following steps will be described as being performed by particular components of FIGS. 1-2. However, it should be understood that the various actions may be performed by alternate components. The various actions may be performed in a different order. Further, some actions may be performed simultaneously, and some may not be required, or others may be added.

The flowchart begins with blocks 505, 510, and 515 as described above with respect to FIG. 5. At block 505, hand tracking data is obtained from camera frames or other sensors of an electronic device, such as a headset. At block 510, hand pose information is determined from the hand tracking data. Then, at block 515, a pinch centroid is determined based on hand pose. The pinch centroid can be determined in a number of ways, as will be described in more detail below with respect to FIG. 7.

The flowchart 600 proceeds to block 620, where user motion is matched to a planar motion. The input motion is mapped from the spherical coordinate system to a 2D plane associated with the UI. According to some embodiments, an arc length of the user's movement is determined according to a spherical coordinate system. The arc length may indicate a distance and direction of a gesture that a hand performs during the input motion. According to some embodiments, the arc length is measured along yaw and pitch, and is mapped to X and Y coordinates. The arc length is also mapped to Z coordinates with respect to radial motion. The coordinates in the spherical coordinate system are projected onto the plane of the UI. In some embodiments, a spherical projection is performed, where the position is proportional to the angle. That is, an amount of distance covered on the user interface plane is based on an angular distance the hand travels during the motion. Alternatively, in some embodiments, the distance covered on the plane will be based on an actual distant the user's hand moves along the arc.

The flowchart includes, at block 625, assigning a deadband around the pinch centroid. According to one or more embodiments, indirect gestures that involve motion, such as a drag gesture or scroll, can utilize a deadband surrounding a user input location. The deadband may be used to reduce jitter based on unintended user movement or sensor sensitivity during a user motion. The deadband can include a predefined or dynamic zone around a user input location based on the pinch centroid such that any input determination within the deadband may be reported from the central point of the deadband. As such, a user performing the motion with a slight jitter may not see the jitter reflected back in the movement direction on the user interface.

At block 630, sensitivity scaling is applied to the motion. In some embodiments, the sensitivity scaling may include an acceleration curve. The acceleration curve can be applied to preserve low-speed precision by applying a unity gain factor on the positional change at low speeds. At higher speeds, the acceleration curve can allow input to travel further by increasing the gain for higher speeds. In some embodiments, equivalently or scaling can be applied on output motion to compensate or a UI component changing in size as a distance of the UI changes distance with respect to the user. Further, in some embodiments, asymmetric gains for the sensitivity scaling may be applied based on direction, such as planar and/or rotational direction of the movement.

The flowchart 600 proceeds to block 635, where a user input location is determined based on scaling. For example, a particular location on a UI plane may be determined as a target location for UI input in accordance with the scaling. The flowchart 600 concludes at block 640, where an input gesture is processed for potential input action using the user input location. For example, a cursor or other input component may be caused to move along the UI plane in accordance with the mapping. Because the mapping considers distance as well as direction, a corresponding distance and direction will be apparent based on the change presentation of the UI component. UI component may include, for example, a cursor, a scrollbar, or other movement-based input component.

Figure 7:
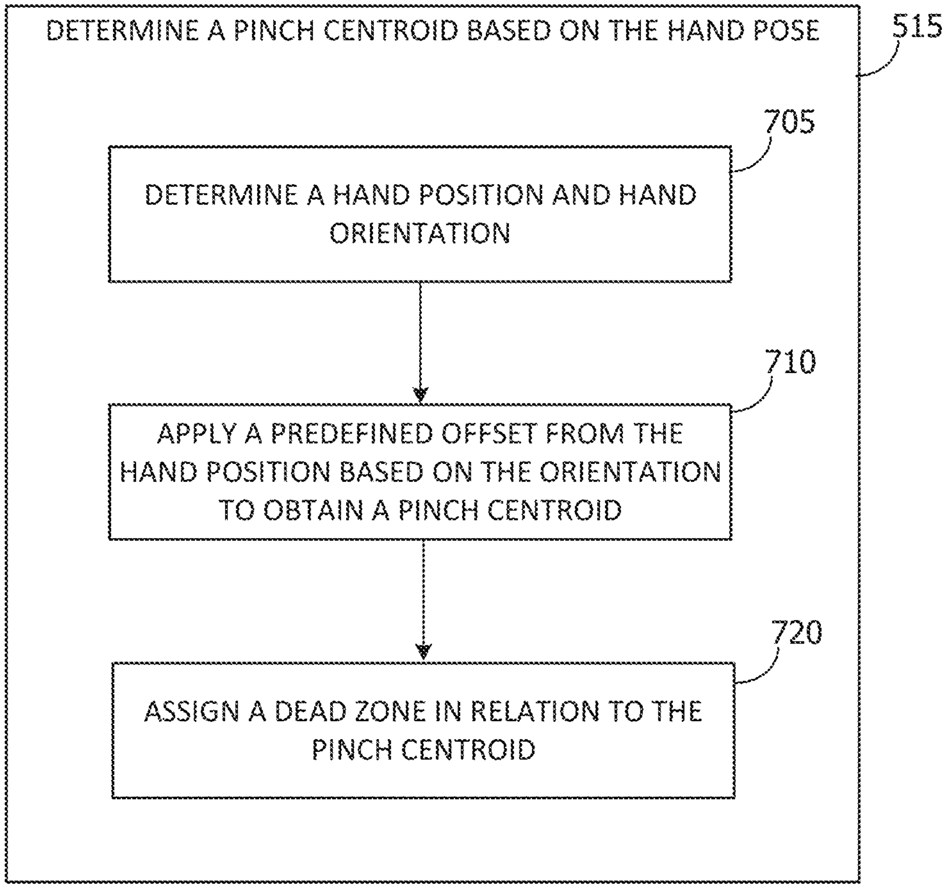
FIG. 7 shows a flowchart of a technique for determining a pinch centroid, in accordance with one or more embodiments.

FIG. 7 shows a flowchart of a technique for determining a pinch centroid, in accordance with one or more embodiments. In particular, FIG. 7 depicts an example technique for determining a pinch centroid for processing user input, as described above with respect to FIG. 5 and FIG. 6. For purposes of explanation, the following steps will be described as being performed by particular components of FIGS. 1-2. However, it should be understood that the various actions may be performed by alternate components. The various actions may be performed in a different order. Further, some actions may be performed simultaneously, and some may not be required, or others may be added.

The flowchart begins at block 705, where, as part of determining a pinch centroid from block 515, a hand pose including a hand position and orientation are determined. The hand pose may be determined based on hand tracking data or other data providing positional information for the hand. In some embodiments, the hand pose may be an estimation based on predicted locations of one or more joints of the hand. For example, a hand tracking network may provide estimated locations of each of a set of joints of the hand. In some embodiments, a hand pose may be determined based on a relative location of a set for subset of these joints. For example, the relative location of the wrist location 118, index finger knuckle 114, and pinky knuckle 116 may provide a geometric plane from which the orientation of the hand can be determined. The position of the hand in world space can be determined similarly. In some embodiments, the positional location of the hand may be determined based on the same subset of joint locations, or a different subset of joint locations. For example, the wrist location and index knuckle location may be used. In addition, the subset of joint locations used for determining the position and/or orientation for the hand may be dynamically modified based on contextual information, hand tracking information, or the like. For example, an occlusion determination may be made based on the joint locations. If a portion of the hand is occluded, such as the pinky knuckle 116, an alternative joint location may be used for determining orientation, position, or the like. According to one or more embodiments, the hand tracking information may be upsampled prior to determining the hand pose.

At block 710, a predefined offset is applied from the hand position based on the orientation to obtain a pinch centroid. This may be a predefined global offset distance for any user, a personalized offset distance for a particular user (for example from a user profile store, enrollment data, or the like), or some other distance. In some embodiments, the offset may be determined in a predefined direction based on the hand pose data. For example, based on a plane derived from the wrist joint, index finger knuckle, and pinky knuckle, the offset may be determined at a predefined angle. The result of the offset from the hand pose provides the pinch centroid. Notably, the pinch centroid may not be collocated with the actual location where contact occurs between the two fingers.

According to one or more embodiments, a dynamic deadband can be used. The dynamic deadband can change in size when conditions are more susceptible to noise. This may be based on environmental conditions, characteristics of the UI component, or the like. When a dynamic deadband is implemented, a target deadband size may be determined. The size of a current deadband will change across a series of frames in the temple fashion such that the transition from the current deadband to a target deadband is smoothed over a series of frames.

The flowchart concludes at block 720, where a dead zone is assigned in relation to the pinch centroid. The dead zone can include a predefined or dynamic zone around the pinch centroid such that any input determination within the dead zone may be reported as a tap or stationary gesture. That is, the motion detected within the dead zone is discarded for consideration of a user input gesture. In doing so, jitter from unintended user movement for sensors sensitivity can be mitigated. For example, if the duration of a pinch lasts multiple frames, but the location of the pinch remains within the dead zone, then the resulting output may be considered to be tap gesture or other stationary gesture. In contrast, if during the duration of the pinch, the pinch centroid exits the dead zone, then the motion of the pinch will be considered for the resulting user input.

In some embodiments, a dynamic dead zone may be used. The dynamic dead zone may adapt in size based on characteristics of user actions or motions. In one example, the dead zone may be decreased or reduced, or may not be considered when a user motion involves less movement and, thus, the distinction between a stationary gesture and dynamic gesture is less apparent. As another example, if a movement is detected that involves rotation around the wrist, such as a stationary wrist position compared to a motion of the pinch centroid, then the dead zone may be reduced or removed. As another example if a user is performing a gesture in which the user is holding a pinch, if the user is initially still for a threshold amount of time, the dead zone may be reduced or removed. As another example, a high velocity pinch detected based on a distance between the two fingers involved in the pinch is changing at a rate that exceeds a predefined threshold. If a high velocity pinch is detected, then the size of the dead zone can be increased. By increasing the size of the dead zone for fast pinches, the system can accept less precise gestures.

Figure 8:
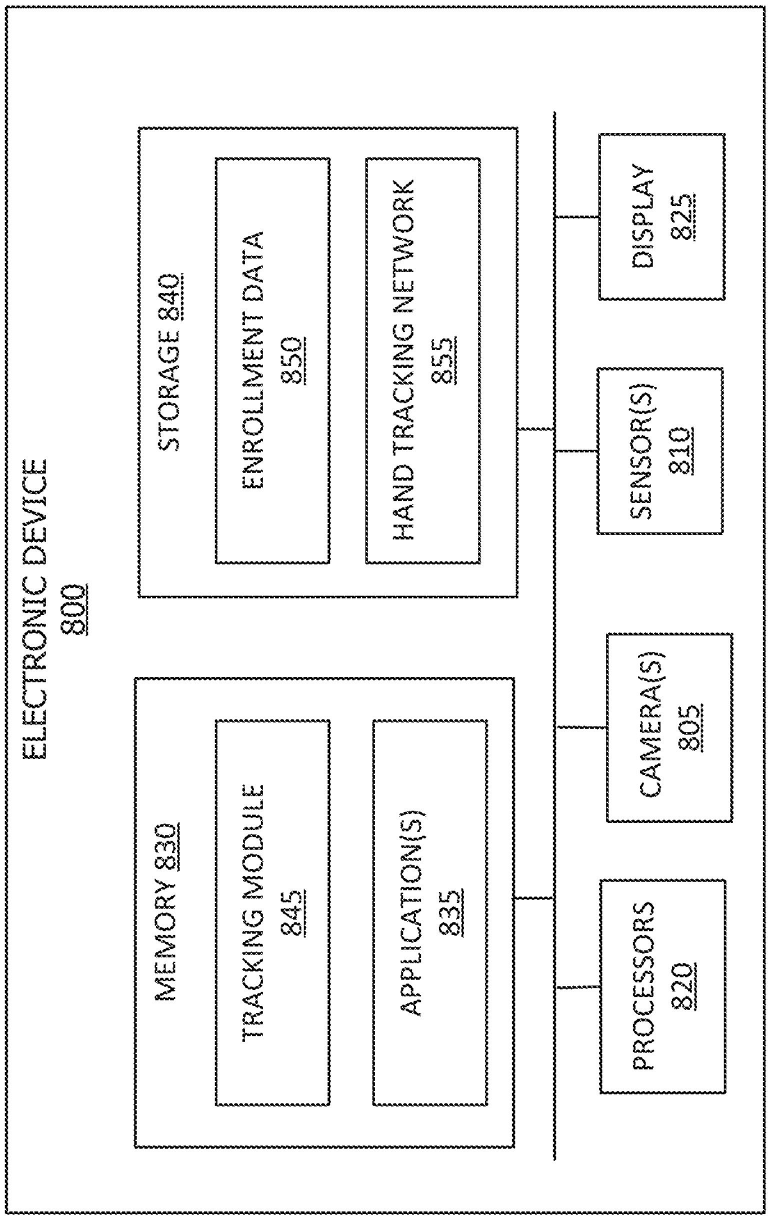
FIG. 8 shows a system diagram of an electronic device which can be used for gesture recognition, in accordance with one or more embodiments.

Referring to FIG. 8, a simplified block diagram of an electronic device 800 is depicted. Electronic device 800 may be part of a multifunctional device, such as a mobile phone, tablet computer, personal digital assistant, portable music/video player, wearable device, head-mounted systems, projection-based systems, base station, laptop computer, desktop computer, network device, or any other electronic systems such as those described herein. Electronic device 800 may include one or more additional devices within which the various functionality may be contained or across which the various functionality may be distributed, such as server devices, base stations, accessory devices, etc. Illustrative networks include, but are not limited to, a local network such as a universal serial bus (USB) network, an organization's local area network, and a wide area network such as the Internet. According to one or more embodiments, electronic device 800 is utilized to interact with a user interface of an application 835. It should be understood that the various components and functionality within electronic device 800 may be differently distributed across the modules or components, or even across additional devices.

Electronic Device 800 may include one or more processors 820, such as a central processing unit (CPU) or graphics processing unit (GPU). Electronic device 800 may also include a memory 830. Memory 830 may include one or more different types of memory, which may be used for performing device functions in conjunction with processor(s) 820. For example, memory 830 may include cache, ROM, RAM, or any kind of transitory or non-transitory computer-readable storage medium capable of storing computer-readable code. Memory 830 may store various programming modules for execution by processor(s) 820, including tracking module 845, and other various applications 835. Electronic device 800 may also include storage 840. Storage 840 may include one more non-transitory computer-readable mediums including, for example, magnetic disks (fixed, floppy, and removable) and tape, optical media such as CD-ROMs and digital video disks (DVDs), and semiconductor memory devices such as Electrically Programmable Read-Only Memory (EPROM) and Electrically Erasable Programmable Read-Only Memory (EEPROM). Storage 840 may be utilized to store various data and structures which may be utilized for storing data related to hand tracking and UI preferences. Storage 840 may be configured to store hand tracking network 855, and other data used for determining hand motion, such as enrollment data 850, according to one or more embodiments. Electronic device may additionally include a network interface from which the electronic device 800 can communicate across a network.

Electronic device 800 may also include one or more cameras 805 or other sensors 810, such as a depth sensor, from which depth of a scene may be determined. In one or more embodiments, each of the one or more cameras 805 may be a traditional RGB camera or a depth camera. Further, cameras 805 may include a stereo camera or other multi-camera system. In addition, electronic device 800 may include other sensors which may collect sensor data for tracking user movements, such as a depth camera, infrared sensors, or orientation sensors, such as one or more gyroscopes, accelerometers, and the like.

According to one or more embodiments, memory 830 may include one or more modules that comprise computer-readable code executable by the processor(s) 820 to perform functions. Memory 830 may include, for example, tracking module 845, and one or more application(s) 835. Tracking module 845 may be used to track locations of hands and other user motion in a physical environment. Tracking module 845 may use sensor data, such as data from cameras 805 and/or sensors 810. In some embodiments, tracking module 845 may track user movements to determine whether to trigger user input from a detected input gesture. Electronic device 800 may also include a display 825 which may present a UI for interaction by a user. The UI may be associated with one or more of the application(s) 835, for example. Display 825 may be an opaque display or may be semitransparent or transparent. Display 825 may incorporate LEDs, OLEDs, a digital light projector, liquid crystal on silicon, or the like.

Although electronic device 800 is depicted as comprising the numerous components described above, in one or more embodiments, the various components may be distributed across multiple devices. Accordingly, although certain calls and transmissions are described herein with respect to the particular systems as depicted, in one or more embodiments, the various calls and transmissions may be made differently directed based on the differently distributed functionality. Further, additional components may be used, some combination of the functionality of any of the components may be combined.

Figure 9:
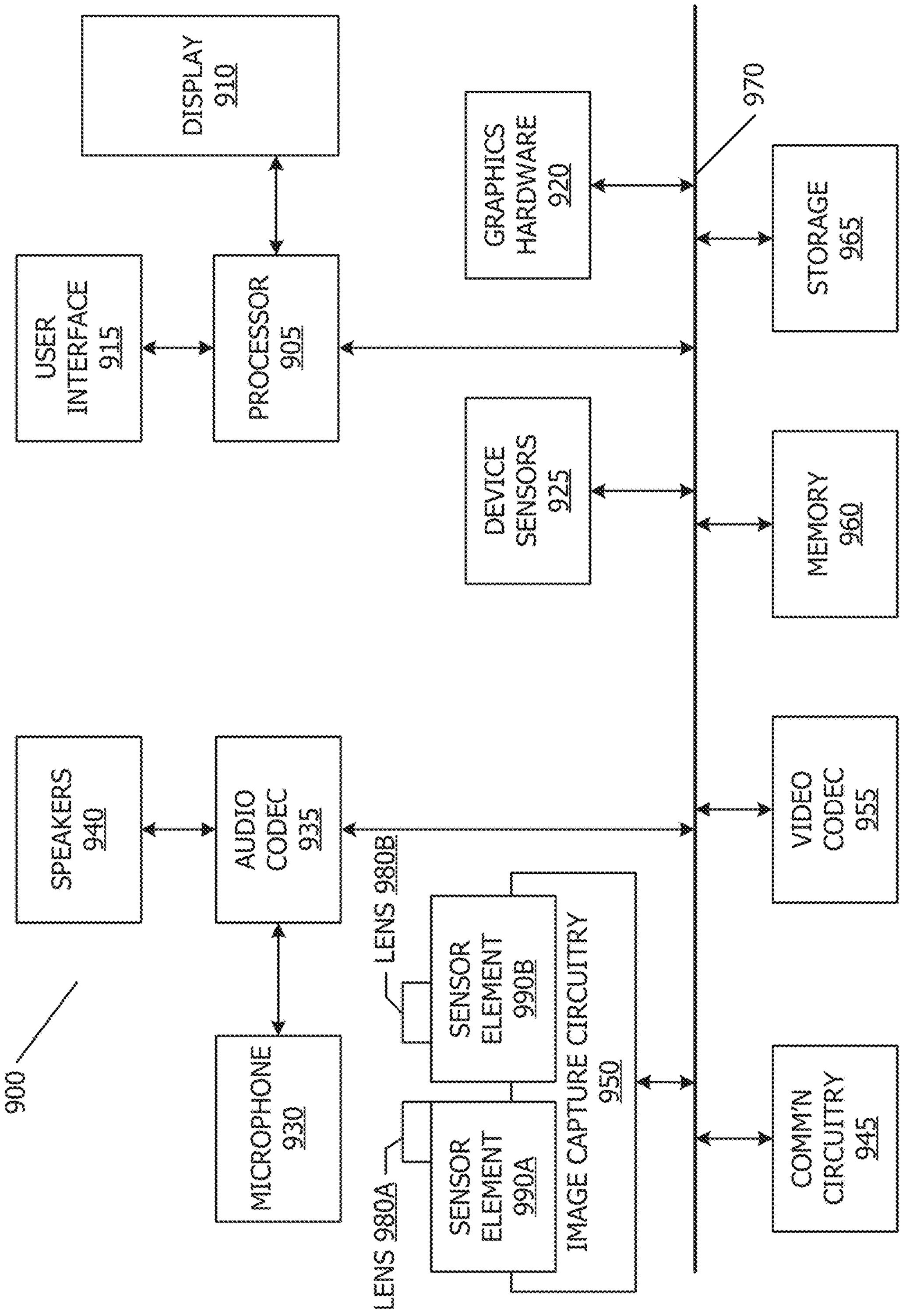
FIG. 9 shows an exemplary system for use in various extended reality technologies.

Referring now to FIG. 9, a simplified functional block diagram of illustrative multifunction electronic device 900 is shown according to one embodiment. Each of electronic devices may be a multifunctional electronic device or may have some or all of the described components of a multifunctional electronic device described herein. Multifunction electronic device 900 may include processor 905, display 910, user interface 915, graphics hardware 920, device sensors 925 (e.g., proximity sensor/ambient light sensor, accelerometer and/or gyroscope), microphone 930, audio codec(s) 935, speaker(s) 940, communications circuitry 945, digital image capture circuitry 950 (e.g., including camera system), video codec(s) 955 (e.g., in support of digital image capture unit), memory 960, storage device 965, and communications bus 970. Multifunction electronic device 900 may be, for example, a digital camera or a personal electronic device such as a personal digital assistant (PDA), personal music player, mobile telephone, or a tablet computer.

Processor 905 may execute instructions necessary to carry out or control the operation of many functions performed by device 900 (e.g., such as the generation and/or processing of images as disclosed herein). Processor 905 may, for instance, drive display 910 and receive user input from user interface 915. User interface 915 may allow a user to interact with device 900. For example, user interface 915 can take a variety of forms, such as a button, keypad, dial, a click wheel, keyboard, display screen, touch screen, gaze, and/or gestures. Processor 905 may also, for example, be a system-on-chip such as those found in mobile devices and include a dedicated GPU. Processor 905 may be based on reduced instruction-set computer (RISC) or complex instruction-set computer (CISC) architectures or any other suitable architecture and may include one or more processing cores. Graphics hardware 920 may be special purpose computational hardware for processing graphics and/or assisting processor 905 to process graphics information. In one embodiment, graphics hardware 920 may include a programmable GPU.

Image capture circuitry 950 may include two (or more) lens assemblies 980A and 980B, where each lens assembly may have a separate focal length. For example, lens assembly 980A may have a short focal length relative to the focal length of lens assembly 980B. Each lens assembly may have a separate associated sensor element 990A and 990B. Alternatively, two or more lens assemblies may share a common sensor element. Image capture circuitry 950 may capture still and/or video images. Output from image capture circuitry 950 may be processed by video codec(s) 955 and/or processor 905 and/or graphics hardware 920, and/or a dedicated image processing unit or pipeline incorporated within circuitry 950. Images so captured may be stored in memory 960 and/or storage 965.

Sensor and camera circuitry 950 may capture still, and video images that may be processed in accordance with this disclosure, at least in part, by video codec(s) 955 and/or processor 905 and/or graphics hardware 920, and/or a dedicated image processing unit incorporated within circuitry 950. Images captured may be stored in memory 960 and/or storage 965. Memory 960 may include one or more different types of media used by processor 905 and graphics hardware 920 to perform device functions. For example, memory 960 may include memory cache, read-only memory (ROM), and/or random-access memory (RAM). Storage 965 may store media (e.g., audio, image and video files), computer program instructions or software, preference information, device profile information, and any other suitable data. Storage 965 may include one more non-transitory computer-readable storage mediums including, for example, magnetic disks (fixed, floppy, and removable) and tape, optical media such as CD-ROMs and DVDs, and semiconductor memory devices such as EPROM and EEPROM. Memory 960 and storage 965 may be used to tangibly retain computer program instructions, or code organized into one or more modules and written in any desired computer programming language. When executed by, for example, processor 905 such computer program code may implement one or more of the methods described herein.

Various processes defined herein consider the option of obtaining and utilizing a user's identifying information. For example, such personal information may be utilized in order to track motion by the user. However, to the extent such personal information is collected, such information should be obtained with the user's informed consent, and the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well established and in compliance with or above governmental/industry standards. Moreover, these parties will not distribute, sell, or otherwise share such information outside of any reasonable and legitimate purposes.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing specific identifiers (e.g., date of birth), controlling the amount or specificity of data stored (e.g., collecting location data at city level rather than at an address level), controlling how data is stored (e.g., aggregating data across users), and/or other methods.

It is to be understood that the above description is intended to be illustrative and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 2-3 and 5-7 or the arrangement of elements shown in FIGS. 1, 4, and 8-9 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method comprising:

obtaining sensor data of a hand performing a pinch;

determining location information for one or more hand joints and one or more finger joints;

determining a hand position and a hand orientation for the hand from the sensor data based on a location of one or more hand joints;

applying an offset comprising a predefined distance from a hand location corresponding to the hand position and in a direction away from the hand location based on the hand orientation to determine a pinch centroid; and causing movement of a user interface component based on a location of the pinch centroid.

2. The method of claim 1, wherein the movement of the user interface component is further determined based on a deadband applied about the pinch centroid.

3. The method of claim 1, wherein the sensor data is associated with a user motion, and wherein causing movement of a user interface component comprises:

determining an input motion based on the sensor data; and applying a sensitivity scaling to the input motion based on one or more characteristics of the input motion; and adapting a gain for an output based on the input motion and the sensitivity scaling.

4. The method of claim 1, wherein the hand joints comprise an index knuckle, the hand position is based on an index knuckle location, and wherein the offset is applied to the index knuckle location.

5. The method of claim 1, further comprising:

in response to detecting that a location of the pinch centroid remains within a predefined dead zone during a duration of the pinch, processing the pinch as a tap gesture.

6. The method of claim 1, further comprising:

in response to detecting that a location of the pinch centroid exits a dead zone during a duration of the pinch, processing the pinch as a drag gesture.

7. The method of claim 6, wherein the data is associated with a user motion, and wherein a size of the dead zone is adapted in accordance with the user motion.

8. The method of claim 7, further comprising:

in accordance with a determination that the user motion has ceased, reducing a size of the dead zone.

9. A non-transitory computer readable medium comprising computer readable code executable by one or more processors to:

obtain sensor data of a hand performing a pinch;

determining location information for one or more hand joints and one or more finger joints;

determine a hand position and a hand orientation for the hand from the sensor data based on a location of one or more hand joints;

apply an offset comprising a predefined distance from a hand location corresponding to the hand position and in a direction away from the hand location based on the hand orientation to determine a pinch centroid; and cause movement of a user interface component based on a location of the pinch centroid.

10. The non-transitory computer readable medium of claim 9, wherein the movement of the user interface component is further determined based on a deadband applied about the pinch centroid.

11. The non-transitory computer readable medium of claim 9, wherein the sensor data is associated with a user motion, and wherein the computer readable code to cause movement of a user interface component comprises:

determine an input motion based on the sensor data; and apply a sensitivity scaling to the input motion based on one or more characteristics of the input motion; and adapt a gain for an output based on the input motion and the sensitivity scaling.

12. The non-transitory computer readable medium of claim 9, wherein the hand joints comprise an index knuckle, the hand position is based on an index knuckle location, and wherein the offset is applied to the index knuckle location.

13. The non-transitory computer readable medium of claim 9, further comprising computer readable code to:

in response to detecting that a location of the pinch centroid remains within a predefined dead zone during a duration of the pinch, process the pinch as a tap gesture; and in response to detecting that the location of the pinch centroid exits the predefined dead zone during the duration of the pinch, process the pinch as a drag gesture.

14. The non-transitory computer readable medium of claim 13, wherein the sensor data is associated with a user motion, and wherein a size of the predefined dead zone is adapted in accordance with the user motion.

15. The non-transitory computer readable medium of claim 14, further comprising computer readable code to:

in accordance with a determination that the user motion has ceased, reduce a size of the predefined dead zone.

16. A system comprising:

one or more processors; and one or more computer readable media comprising computer readable code executable by the one or more processors to:

obtain sensor data of a hand performing a pinch;

determining location information for one or more hand joints and one or more finger joints;

determine a hand position and a hand orientation for the hand from the sensor data based on a location of one or more hand joints;

apply an offset comprising a predefined distance from a hand location corresponding to the hand position and in a direction away from the hand location based on the hand orientation to determine a pinch centroid; and cause movement of a user interface component based on a location of the pinch centroid.

17. The system of claim 16, wherein the movement of the user interface component is further determined based on a deadband applied about the pinch centroid.

18. The system of claim 16, wherein the sensor data is associated with a user motion, and wherein the computer readable code to cause movement of a user interface component comprises:

determine an input motion based on the sensor data; and apply a sensitivity scaling to the input motion based on one or more characteristics of the input motion; and adapt a gain for an output based on the input motion and the sensitivity scaling.

19. The system of claim 16, wherein the hand joints comprise an index knuckle, the hand position is based on an index knuckle location, and wherein the offset is applied to the index knuckle location.

20. The system of claim 19, further comprising computer readable code to:

in response to detecting that a location of the pinch centroid remains within a predefined dead zone during a duration of the pinch, process the pinch as a tap gesture; and in response to detecting that the location of the pinch centroid exits the predefined dead zone during the duration of the pinch, process the pinch as a drag gesture.

* * * * *